UNITED STATES PATENT OFFICE.

OTTO P. AMEND, OF NEW YORK, N. Y., ASSIGNOR OF ONE-HALF TO JOSIAH H. MACY, OF SAME PLACE.

PROCESS OF DESULFURIZING REFRACTORY OILS.

SPECIFICATION forming part of Letters Patent No. 601,331, dated March 29, 1898.

Application filed March 3, 1897. Serial No. 625,889. (No specimens.)

*To all whom it may concern:*

Be it known that I, OTTO P. AMEND, a citizen of the United States, residing in the city, county, and State of New York, have invented a new and useful Process of Desulfurizing and Treating Oils and Distillates, of which the following is a specification.

My improved process is more especially designed for the purification and refinement of oils and distillates containing refractory sulfur compounds.

Hitherto it has been the custom of oil-refiners in this country in their treatment of oil to employ the ordinary sulfuric acid of commerce. This acid is supposed to indicate a specific gravity of 66° Baumé, and when fully up to the standard in strength indicates 92.38 per cent. of $H_2SO_4$. In very many instances the acid employed, especially in refining Pennsylvania oil, has been of less strength or below 92.38 per cent. of $H_2SO_4$.

Acid manufacturers have also manufactured and offered on the market a strong acid produced by a system of concentration obtained by the application of heat. This acid has a specific gravity of 67° Baumé and upward, and is represented to possess a strength of ninety-eight per cent. of $H_2SO_4$.

In Russia it has been customary to use fuming acid, or an acid containing fully one hundred per cent. of $H_2SO_4$, and in addition thereto an amount of $SO_3$ or anhydrous sulfuric acid.

In the desulfurization of some of the Ohio and Canadian oils and distillates I have found that ordinary 66° Baumé or commercial acid having a strength of 92.38 per cent. of $H_2SO_4$ is not strong enough to satisfactorily act upon, split up, or change the sulfur compounds, which are the source of all the trouble, and that if a splitting up or change is not effected in the said sulfur compounds the sulfur in the oil or distillate cannot be eliminated or reduced to a satisfactory degree. I have also found that the so-called "strong acid" containing ninety-eight per cent. of $H_2SO_4$, previously referred to, will not of itself answer the purpose, inasmuch as it will not produce the desired reaction on the sulfur compounds in the oil that admits of their removal.

The fuming sulfuric acid used by the Russians will act upon the unsaturated hydrocarbons with such violence, in consequence of the presence of free $SO_3$ or anhydrous sulfuric acid, as to made its use very objectionable, if not prohibitory.

I find that the sulfur compounds in the oil or distillate may be split up or changed and that the required reaction essential for the removal of sulfur can be brought about by the employment of common commercial acid of 66° Baumé specific gravity if strengthened to the necessary degree by the addition of anhydrous sulfuric acid ($SO_3$) and the application of the strengthened acid be renewed until such effect is obtained. The strength of the acid and the number of applications will depend entirely upon the character of the oil or distillate and the sulfur compound contained in it. With some light naphthas an acid strengthened by the addition of $SO_3$ until it indicates ninety-three per cent. of $H_2SO_4$ will answer a good purpose with two applications. Heavier distillate with a more refractory sulfur compound may require an acid that has been strengthened, as described, until it indicates a strength of ninety-six per cent. of $H_2SO_4$. Most of the distillates containing refractory sulfur compounds have been satisfactorily operated upon by me with an acid strengthened to indicate from ninety-six to ninety-eight per cent. of $H_2SO_4$ and with but two applications of the strengthened acid. The necessary strength can only be determined by trying a small quantity in a small separatory funnel. Acid strengthened in the manner described seems to possess properties not possessed by the other acid. At least a ninety-six or ninety-eight per cent. strengthened acid will produce a reaction of the sulfur compounds that is not produced by the ninety-six or ninety-eight per cent. concentrated acid made strong by the system of evaporation. The first and important step is to split up the sulfur compounds in the oil or distillate, and thereafter the sulfur may be reduced in quantity by washing with water or by exposing the sulfur compounds one or more times to the action of an oxid or hydrate of an alkali or an alkaline earth, preferably to dry hydrated lime, by heating and by dehydrating the oil or distillate.

I find that I produce a more favorable result by effecting a partial dehydration of the distillate with the ordinary weak acid rather than with the strengthened acid and that I can make a better burning-oil by employing a small percentage of weak acid for the removal of some of the sulfo compounds produced by the use of the strengthened acid, although neither are necessary.

In carrying out my invention I first partially dehydrate the oil or distillate by agitating it with about one-half per cent. of common commercial acid. I then remove the sludge, allow the distillate to settle well, draw off the remaining sludge, and apply about three per cent. of commercial acid (66° Baumé) that has been strengthened by the addition of $SO_3$, or anhydrous sulfuric acid, until a degree of strength has been attained that will effect the desired change or splitting up of the sulfur compounds with one or more applications of acid. After proper agitation I remove the spent acid or sludge, and when well settled out I repeat the operation until the acid-treated oil or distillate shows indications that the sulfur compounds have been split up and will precipitate when exposed to the action of plumbate of soda or other compound used for the purpose. I then settle and remove the spent acid and preferably apply about one-half per cent. of the weak 66° Baumé or commercial acid to act upon and remove some of the sulfo compounds formed by the use of the strengthened acid. This is not necessary; but the oil so treated shows better burning qualities. Therefore I prefer to apply it. The acid-treated oil or distillate is then thoroughly washed with water and allowed to settle. The washing may be dispensed with, in which case more lime will be required, and many deleterious compounds will be allowed to remain behind which are detrimental to the oil. Therefore I prefer to wash the distillate thoroughly. When well drained, I add one-half per cent. of alkali or alkaline earth, preferably dry hydrated lime, and agitate thoroughly. The object of this is threefold—to effect partial dehydration, to neutralize the remaining acid, and to present a base that will combine with the sulfur or sulfur compounds. When well settled, I separate the lime from the oil or distillate and apply another one-half per cent. of alkali or alkaline earth, preferably dry hydrated lime, and agitate well to effect more complete dehydration and a combination with the sulfur compounds present. I then apply heat varying, according to the gravity of the oil, from 30° to 80° centigrade. If the dehydration is insufficient, I add another or the third one-half per cent. of alkali or alkaline earth, preferably dry hydrated lime, which will usually effect satisfactory dehydration and remove the remnants of the acid and other sulfur compounds. In fact the last one-half per cent. of lime is not always necessary. Oil finished in this manner will be practically free of sulfur, will climb the wick readily, and give a good bright white light.

Having described my invention, what I claim as new, and desire to secure by Letters Patent of the United States, is—

1. The process of desulfurizing and treating petroleum oil or distillate containing refractory sulfur compounds as Lima or Canadian oil or distillate, which consists: in treating the oil or distillate with sulfuric acid having a higher percentage of $H_2SO_4$ than is found in ordinary commercial 66° Baumé acid and containing $SO_3$ or anhydrous sulfuric acid; in repeating the application of such acid until a splitting up of the sulfur compounds in the oil or distillate is effected; then removing the acid sludge and exposing the split-up sulfur compounds to the action of an agent or reagent having an affinity for sulfur; and in effecting the dehydration of the distillate.

2. The process of desulfurizing and treating petroleum oil or distillate containing refractory sulfur compounds, as Lima or Canadian oil or distillate, which consists: in treating the oil or distillate with sulfuric acid, containing a higher percentage of $H_2SO_4$ than is found in ordinary commercial 66° Baumé acid, strengthened by the addition of $SO_3$ or anhydrous sulfuric acid; in repeating the application of such acid until a splitting up of the sulfur compounds in the oil or distillate is effected; in removing the acid from the oil or distillate and exposing the latter to the action of an oxid or hydrate of an alkali or alkaline earth, preferably to dry hydrated or caustic lime; and in effecting the dehydration of the distillate, substantially as set forth.

3. The process of desulfurizing and treating petroleum oil or distillate containing refractory sulfur compounds, as Lima or Canadian oil or distillate, which consists: in treating the oil or distillate with sulfuric acid, containing a higher percentage of $H_2SO_4$ than is found in ordinary commercial 66° Baumé acid, strengthened by the addition of $SO_3$ or anhydrous sulfuric acid; in repeating the application of such acid until a splitting up of the sulfur compounds in the oil or distillate is effected; in removing the strong acid from the oil or distillate and subjecting the latter to the action of a weaker acid, then removing the weak-acid sludge and exposing the oil or distillate, one or more times, to the action of an oxid or hydrate of an alkali or alkaline earth, preferably to dry hydrated or caustic lime; and in effecting the dehydration of the oil or distillate, substantially as described.

4. The method of desulfurizing and treating petroleum oil or distillate containing refractory sulfur compounds, as Lima or Canadian oil or distillate, which consists: in treating the oil or distillate with sulfuric acid, containing a higher percentage of $H_2SO_4$ than is found in the ordinary commercial 66° Baumé acid, strengthened by the addition of $SO_3$ or anhydrous sulfuric acid; in repeating the application of such acid until a splitting up of the sulfur compounds in the oil or distillate is effected; in removing the acid from the oil or distillate and exposing the oil or distillate, one or more times, to the action of an oxid or hydrate of an alkali or alkaline earth, preferably to dry hydrated or caustic lime; in exposing the oil or distillate to the action of alkali or alkaline earth in the presence of heat; and in dehydrating the distillate, substantially as described.

5. The method of desulfurizing and treating petroleum oil or distillate containing refractory sulfur compounds, as Lima or Canadian oil or distillate, which consists: in treating the oil or distillate with sulfuric acid, containing a higher percentage of $H_2SO_4$ than is found in ordinary commercial 66° Baumé acid, strengthened by the addition of $SO_3$ or anhydrous sulfuric acid; in repeating the application of such acid until a splitting up of the sulfur compounds in the oil or distillate is effected; in removing the strong acid from the oil or distillate and subjecting the oil or distillate to the action of a weaker acid, then removing the weak-acid sludge and exposing the oil or distillate, one or more times, to the action of an oxid or hydrate of an alkali or alkaline earth, preferably to dry hydrated or caustic lime; in exposing the oil or distillate to the action of an alkali or alkaline earth in the presence of heat; and in effecting the dehydration of the distillate, substantially as described.

6. The method of desulfurizing and treating petroleum oil or distillate containing refractory sulfur compounds, as Lima or Canadian oil or distillate, which consists: in treating the oil or distillate with sulfuric acid, containing a higher percentage of $H_2SO_4$ than is found in ordinary commercial 66° Baumé acid, strengthened by the addition of $SO_3$ or anhydrous sulfuric acid; in repeating the application of such acid until a splitting up of the sulfur compounds in the oil or distillate is effected; then removing the strong acid and subjecting the oil or distillate to the action of a weaker acid; in removing the weak-acid sludge and washing the oil or distillate; in dehydrating the oil or distillate and exposing the same, one or more times, to the action of an oxid or hydrate of an alkali or alkaline earth, preferably to dry hydrated or caustic lime, substantially as described.

7. The method of desulfurizing and treating petroleum oil or distillate, containing refractory sulfur compounds, as Lima or Canadian oil or distillate, which consists: in treating the oil or distillate with sulfuric acid, containing a higher percentage of $H_2SO_4$, than is found in the ordinary commercial 66° Baumé acid, strengthened by the addition of $SO_3$ or anhydrous sulfuric acid; in repeating the application of such acid until a splitting up of the sulfur compounds in the oil or distillate is effected; then removing the strong acid and subjecting the oil or distillate to the action of a weaker acid; in removing the weak-acid sludge and washing the oil or distillate; in dehydrating the oil or distillate and exposing the same, one or more times, to the action of an oxid or hydrate of an alkali or alkaline earth, preferably to dry hydrated or caustic lime; and in exposing the oil or distillate to the action of an alkali or alkaline earth in the presence of heat, substantially as described.

8. The method of treating oil or distillate containing refractory sulfur compounds, as Lima or Canadian oil or distillate, which consists: in subjecting the oil or distillate to the action of sulfuric acid, containing a higher percentage of $H_2SO_4$ than is found in ordinary commercial 66° Baumé acid, strengthened by the addition of $SO_3$ or anhydrous sulfuric acid; then removing the strong-acid sludge and then subjecting the oil or distillate to the action of the ordinary acid treatment, substantially as described.

OTTO P. AMEND.

Witnesses:
EDWARD B. AMEND,
ROBERT F. AMEND.